United States Patent [19]
Gholizadeh et al.

[11] Patent Number: 5,369,737
[45] Date of Patent: Nov. 29, 1994

[54] NORMALIZATION OF VECTORS ASSOCIATED WITH A DISPLAY PIXELS OF COMPUTER GENERATED IMAGES

[75] Inventors: Dariush Gholizadeh, Worcester; Hamid Assarpour, Harvard; Mohamed Messaoudene, Cambridge, all of Mass.

[73] Assignee: Digital Equipment Corporation, Maynard, Mass.

[21] Appl. No.: 568,529

[22] Filed: Aug. 15, 1990

Related U.S. Application Data

[63] Continuation of Ser. No. 405,104, Sep. 8, 1989, abandoned, which is a continuation of Ser. No. 170,749, Mar. 21, 1988, abandoned.

[51] Int. Cl.$^5$ .................. G06F 15/62; G06F 15/72
[52] U.S. Cl. .................. 395/126; 395/132; 395/123
[58] Field of Search .......... 364/522, 521; 340/729, 340/728, 747, 744, 741; 395/126, 132, 123, 120, 129, 127

[56] References Cited

U.S. PATENT DOCUMENTS

| | | | |
|---|---|---|---|
| 4,561,066 | 12/1985 | Emmons et al. | 364/736 |
| 4,709,231 | 11/1987 | Sakaibara et al. | 340/729 |
| 4,808,988 | 2/1989 | Burke et al. | 340/744 |
| 4,835,712 | 5/1989 | Drebin et al. | 395/123 |
| 4,899,295 | 2/1990 | Nonweiler | 364/522 |
| 4,901,064 | 2/1990 | Deering | 340/729 |
| 4,943,938 | 7/1990 | Aoshima et al. | 364/522 |
| 5,063,375 | 11/1991 | Lien et al. | 395/126 X |

OTHER PUBLICATIONS

Foley, James D., *Fundamentals of Interactive Computer Graphics*, pp. 575–591 (Addison–Wesley, 1984).
Bishop, Gary, *Fast Phong Shading*, pp. 103–106, Siggraph, vol. 20, No. 4, 1986.

*Primary Examiner*—Raymond J. Bayerl
*Attorney, Agent, or Firm*—Clayton L. Satow; Barry N. Young; Albert P. Cefalo

[57] ABSTRACT

A computer graphics method of and apparatus for normalizing vector-based terms for a plurality of display pixels associated with a polygon representing a surface of an object being imaged, the vector-based terms being determined from predetermined vectors at vertices of the polygon. The square ($\eta$) of the magnitude of a vector associated with each vector-based term is determined for each display pixel from the predetermined vectors at the vertices of the polygon. The quantity $1/\sqrt{\eta}$ is approximated for each vector-based term using a series expansion employing $\eta$, and each vector based term is multiplied by the corresponding approximation of $1/\sqrt{\eta}$ to produce a normalized vector-based term for each display pixel.

31 Claims, 4 Drawing Sheets

NORMALIZATION OF VECTORS ASSOCIATED WITH A DISPLAY PIXELS OF COMPUTER GENERATED IMAGES

This is a continuation of copending application Ser. No. 07/405,104 filed on Sep. 8, 1989, now abandoned, which is a continuation of Ser. No. 07/170,749 filed on Mar. 21, 1988, now abandoned.

BACKGROUND OF THE INVENTION

The invention relates to the normalization of vectors (e.g., those used to implement shading) associated with display pixels of computer generated images.

In computer graphics, curved surfaces of three-dimensional objects are typically approximated by a plurality of flat surfaces, preferred to as polygons (typically triangles), that are bounded by straight edges that also bound adjacent polygons. The two-dimensional image that is displayed on a cathode ray tube (CRT) or printed is often broken up into a two-dimensional array of pixels, which are the smallest addressable components of an image. A plurality of pixels are used to display each triangle that is associated with a visible surface of the object being imaged.

To produce a realistic image, the intensities (i.e., brightnesses) of the pixels associated with each triangle are varied (i.e., shaded) in accordance with a shading model that takes into account the light sources, surface characteristics, and the positions and orientations of the surfaces and sources. The shading model employs an illumination equation (e.g., equation (1) herein, discussed in detail below) that includes vectors that are normal to the object surface (referred to as "normals") and further vectors; to describe the direction of light sources and the direction of sight.

One shading algorithm, the Phong algorithm, utilizes the surface normals of the vertices of each triangle to interpolate the normals at the pixels within the triangle. The normal at each pixel is normalized (i.e., adjusted to have the same magnitude as other normalized normals) and used in the illumination equation to compute each pixel's intensity. In a typical computer graphics system, the Phong algorithm is executed by first approximating the normal at each pixel within a given triangle by bilinear interpolation of the normals of the vertices of that triangle. Each pixel normal (which includes x, y, and z components) is then normalized by dividing the vector by its magnitude (i.e., the square root of the sum of the squares of the x, y, and z components). Put another way, a vector is normalized by multiplying it times $1/\sqrt{\eta}$, where $\eta$ is the square of the magnitude of the vector. Each normalized pixel normal is then inserted into the illumination equation to determine the intensity for that pixel. This technique requires the performance of relatively complex operations (i.e., division, square root) for each pixel; thus, if implemented in hardware, it would typically require the use of floating point devices. However, the floating point computations are time consuming and thus make it difficult to perform Phong shading in "real-time". Alternately, the Phong algorithm has been implemented in software to eliminate the requirement for floating point hardware, but the execution of the algorithm in software is also relatively time consuming, restricting the performance of real-time Phong shading.

SUMMARY OF THE INVENTION

The invention features, in general, normalizing vector-based terms (e.g., a vector or dot product of vectors) that are used in computer graphics in association with respective display pixels by determining (from the known vectors at vertices of each polygon) the square ($\eta$) of the magnitude of a vector associated with each vector-based term, approximating $1/\sqrt{\eta}$ for each vector-based term by using a series expansion (e.g., Taylor series expansion or Chebyshev polynomial approximation) employing $\eta$, and multiplying each vector-based term by the corresponding approximation of $1/\sqrt{\eta}$ to produce a normalized vector-based term. The calculation of the normalized vector-based term at each pixel requires only a few simple operations, which may be rapidly performed. The validity of the approximation can be guaranteed by making sure that angles between vectors at the vertices are smaller than limits based upon the number of terms in the expansion and the accuracy (e.g., number of bits used to describe each pixel's intensity) of the results employing the vector-based term.

In preferred embodiments, a fixed-point multiplier and adder are used to approximate $1/\sqrt{\eta}$ and multiply it times the vector-based term; $\eta$ is determined by a biquadratic interpolation; the vectors are normal vectors (N) used to determine the diffuse intensity and the specular intensity at each pixel, and these intensities are combined with an ambient light intensity to provide a final intensity for each pixel. The invention can be used with one or more light sources located at infinity with respect to the object being imaged or with one or more light sources disposed at finite distances from the object. Light vectors corresponding to light sources located at infinite distances from the object need not be normalized.

When the light source (or sources) is located a finite distance from the object, predetermined light vectors (representing the direction of each light source with respect to the object) at the vertices of the polygon are interpolated over the polygon to produce an interpolated light vector for each light source at each display point, with each interpolated light vector at each display point being normalized by determining $\eta$ for that vector, approximating $1/\sqrt{\eta}$ for that vector using the series expansion employing $\eta$, and multiplying each interpolated light vector by the corresponding approximation of $1/\sqrt{\eta}$. The normalized light vectors for each light source at each display pixel are then added together.

Thus, in the invention, the calculation of the normalized normal vector and/or light vector (or vectors) at each pixel requires only a few simple operations, which may be rapidly performed (e.g. in a few machine cycles) with fixed point hardware or in software, thereby enabling Phong shading to be performed in real time. Further, the series expansion coefficients are generic-once initially determined, the coefficients apply to produce shading for all of the pixels within all of the polygons (i.e., triangles) used to represent the surfaces of a displayed image. This reduces the amount of preprocessing necessary to support Phong shading.

Other advantages, and features of the invention will be apparent from the following description of the preferred embodiment and from the claims.

DESCRIPTION OF THE PREFERRED EMBODIMENT

Drawings

We first briefly describe the drawings.

Structure and Operation

Figure 1:
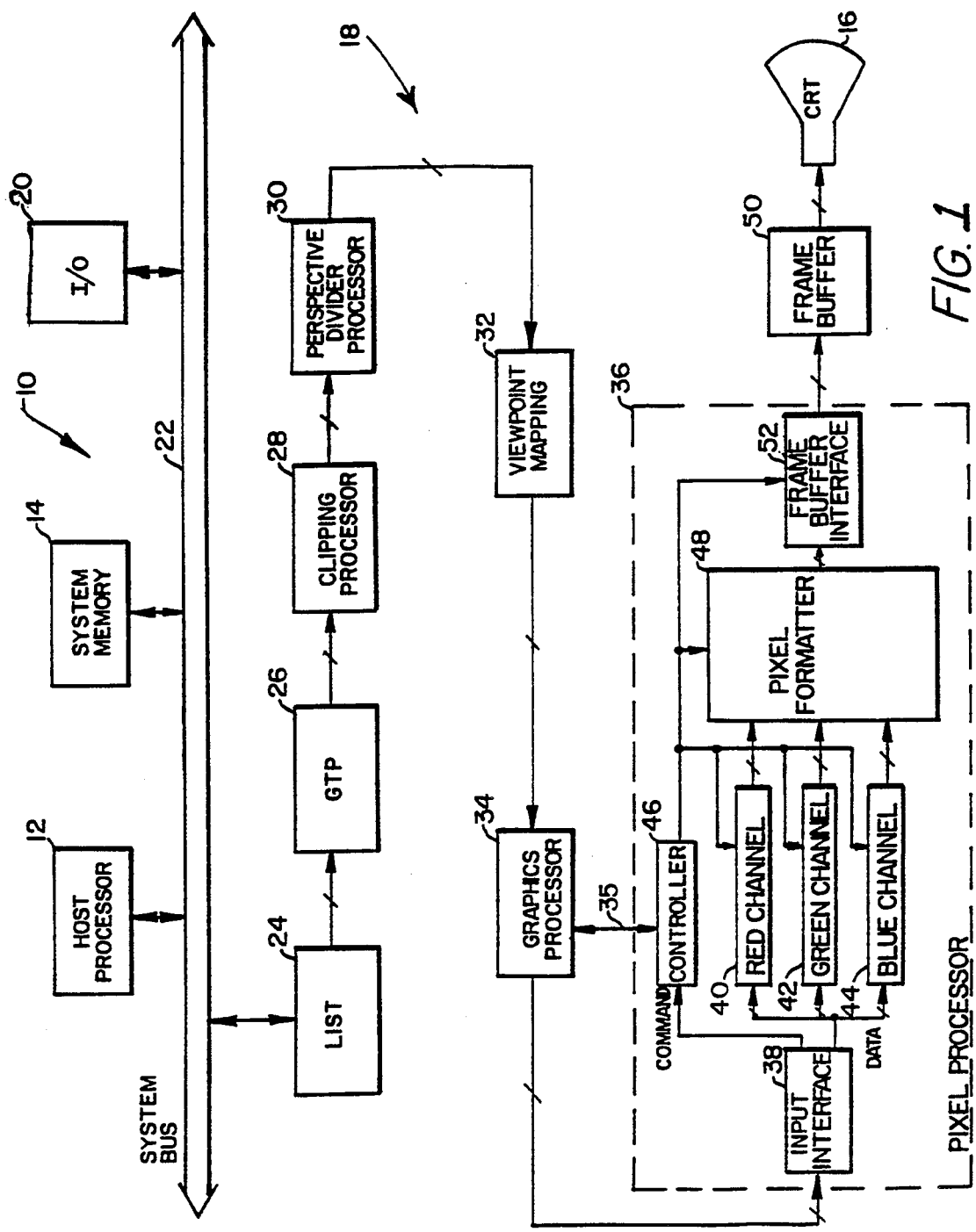
FIG. 1 is a block diagram of a computer imaging system.

Referring to FIG. 1, computer imaging system 10 includes host processor 12, which responds to an operating system program and user programs stored in system memory 14 by producing image data and commands necessary to generate, via image display pipeline 18, an image of an object or objects for display on CRT 16. Host processor 12 communicates with system memory 14, image display pipeline 18 and various input/output (I/O) processors 20 via system bus 22. For a thorough discussion of the principal concepts of interactive computer graphics, see *Fundamentals of Interactive Computer Graphics*, by J. D. Foley and A. Van Dam, published by Addison-Wesley Publishing Company, 1982.

Host processor 12 sends the image data and commands to display list memory 24, the first stage of image display pipeline 18. The surfaces of the image are represented by a number of adjoining polygons, such as triangles, various coordinates of which are stored in display list memory 24. Each command from host processor 12 reads the coordinate associated with a triangle, such as the vertices of the triangle (i.e., x1, y1, z1; x2, y2, z2, x3, y3, z3) and directions of normals, N, and light vectors, L, extending from the vertices.

The coordinates are applied to geometry transformation processor (GTP) 26, which performs matrix multiplication operations on the vertices to manipulate (i.e., rotate, move, scale) the triangle (and hence the image) in space. Next, clipping processor 28 allows portions of the image to be displayed by manipulating coordinates of a "bounding box" to "clip" away undesired portions of the image.

Perspective/divider processor 30 divides the coordinates by a scaling factor to provide a three-dimensional effect to the displayed image. The display coordinates produced by perspective/divider processor 30 are "real-world" coordinates having locations between $-1$ and $+1$. Viewport mapping processor 32 transforms the coordinates into screen space coordinates according to the resolution of the display screen of CRT 16. For example, for a display screen 1280 pixels by 1024 pixels in size, each x coordinate is transformed to a screen location between 0 and 1279, and the location of each y coordinate is transformed to between 0 and 1023.

The translated pixel coordinates of the triangle vertices are applied to graphics processor 34, which performs preprocessing for pixel processor 36 to compute the length and slope of the lines to be drawn on CRT 16 between the pixel coordinates. Pixel processor 36 comprises a matrix (e.g., a 4 by 4 matrix) of individual pixel processors, each constructed as shown in FIG. 1. Graphics processor 34 also determines initial conditions and interpolation constants for use by pixel processor 36 in shading the triangles, as discussed in detail below.

Graphics processor 34 applies both data and commands for drawing and shading each triangle to input interface 38 in pixel processor 36. Input interface 38 applies the data in parallel to red channel 40, green channel 42, and blue channel 44 (although it is understood that in a black and white system only one channel would be required). The commands from graphics processor 34 are applied by input interface 38 to controller 46, which also receives control signals directly from graphics processor 34 via bus 35. The operation of each channel 40, 42, 44 is directed by controller 46 in a manner discussed in detail below.

Each channel 40, 42, 44 produces output signals corresponding to the intensities of the pixels in each of the triangles. That is, channels 40, 42, 44 each apply an intensity word to pixel formatter 48 for each display pixel. Pixel formatter 48, also responsive to controller 46, applies a 32 bit (4 byte) data word to frame buffer 50, via interface 52, consisting of 1 byte (i.e., eight bits) of pixel information from each channel 40, 42, 44 and a fourth byte which provides information for "overlay planes" and "windowing".

In frame buffer 50, the three 8-bit words from channels 40, 42, 44 are stored for each pixel to describe the red, green and blue intensities, respectively, in the color image displayed on CRT 16 (or printed) according to well-known video techniques.

As part of computing the intensity of each pixel, pixel processor 36, specifically red, green and blue channels 40, 42, 44, implements a shading algorithm, such as the Phong algorithm, to produce realistic shading of the object imaged on CRT 16. The Phong algorithm uses the following illumination equation to compute pixel intensity (I):

$$I = I_a + K_d \Sigma(N \cdot L) + K_s \Sigma(N \cdot H)^n \quad (1)$$

or $$I = I_a + I_d + I_s \quad (2)$$

In equations (1) and (2), $I_a$ is the intensity of the ambient light, $I_d$ is the intensity of the diffuse (i.e., equally scattered in all directions) reflection of light from the surface, and $I_s$ is the intensity of the specular reflection from the surface (i.e., the highlight-type of reflection caused by the shininess of the surface). The diffuse factor, $K_d$, is a constant having a value between 0 and 1 in accordance with the material of the object being imaged. The specular factor, $K_s$, is also a constant and is selected empirically to provide a realistic specular reflection. The glossiness degree, n, varies between 1 and 200, increasing with increased reflectivity.

The vector L in equation (1) represents the direction in the x-y-z coordinate system (i.e., $L_x$, $L_y$, $L_z$) from the imaged object to a point light source, with equation (1) being generalized for a plurality of point light sources. For clarity in discussing the invention, a single point light source will be assumed unless otherwise noted. Likewise, for simplicity, the point light source will be assumed to be an infinite distance away from the imaged object unless otherwise noted. The specular reflection vector H is equal to $(L+s)/2$, where s is a vector representing the direction of sight ($s_x$, $s_y$, $s_z$) from the object. Equation (1) is generalized to include a plurality of H vectors, but a single H vector will be assumed for purposes of the present discussion.

Figure 2:
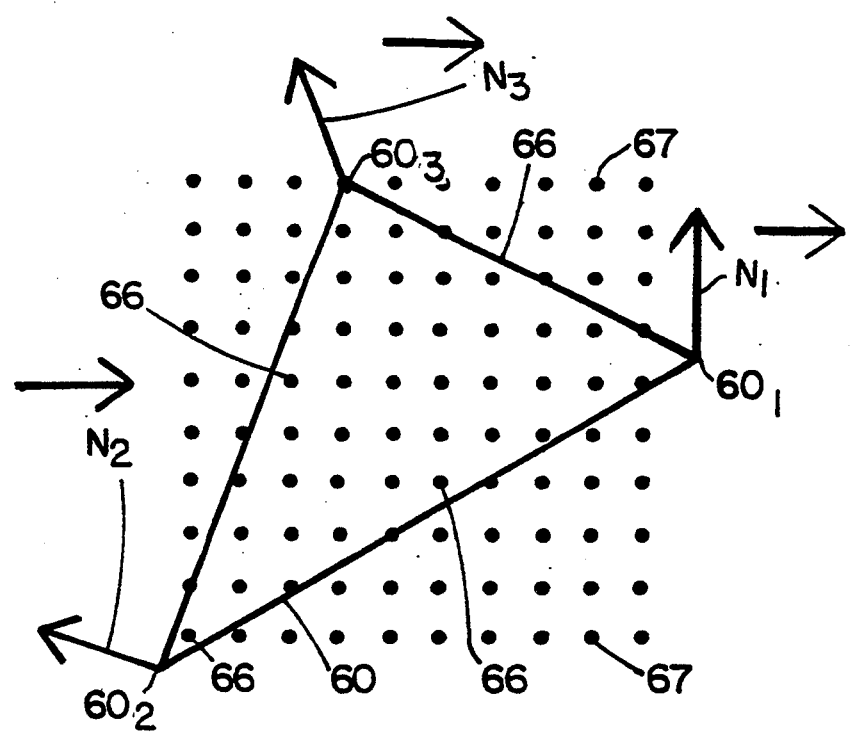
FIG. 2 depicts a triangle in a field of display pixels.

Referring also to FIG. 2, the vector N, used in both the diffuse intensity and specular intensity terms of equation (1), represents the outward normal in the x-y-z coordinate system ($N_x$, $N_y$, $N_z$) to the surface of the triangle at the pixel. (Normal vector N must be normalized when used in equation (1), as discussed in detail below.) Each pixel's normal vector is determined from the vertex normals of the triangle containing that pixel, which are in turn calculated by host processor 12. For example, consider triangle 60, which has vertices $60_1$, $60_2$, $60_3$. Most processor calculates normal vectors $N_1$, $N_2$, $N_3$ at vertices $60_1$, $60_2$, $60_3$, respectively, and passes them to graphics processor 34 via the remainder of display pipeline 18.

When triangle 60 is displayed on CRT 16, it includes a number of display pixels 66 (shown as points on FIG. 2) which either form its segments (i.e., lines $60_1$–$60_2$, $60_2$–$60_3$, $60_3$–$60_1$) or are located within the segments. Other pixels 67 are disposed outside triangle 60 (possibly within another triangle). To calculate the intensity at each pixel 66 using the Phong algorithm, the normal vector N for each pixel 66 is first determined. The Phong algorithm provides an approximation of the normal, N(x,y), at each pixel 66 within triangle 60 by bilinearly interpolating the vertex normal vectors $N_1$, $N_2$, $N_3$ of triangle 60 according to the equation:

$$N(x,y) = Ax + By + C \quad (3)$$

where x and y are pixel display coordinates and A, B, and C are triangle interpolation constants calculated by graphics processor 34 based on vertex normal vectors $N_1$, $N_2$, $N_3$, which are supplied (already normalized) by host processor 12 via the other elements of image display pipeline 18.

Implementation of the Phong algorithm requires that the normal vector N(x,y) of each pixel be normalized, that is, divided by its magnitude, before being inserted into illumination equation (1). The normalization equation is:

$$N = N(x,y)/\sqrt{\eta} \quad (4)$$

where $\eta = N_x^2 + N_x^2 + N_z^2$ (i.e the sum of the squares of the x, y, and z components of the normal at pixel 66). The normalized normal vector N of pixel 66 is then inserted into illumination equation (1) and the intensity of that pixel evaluated.

Figure 3:
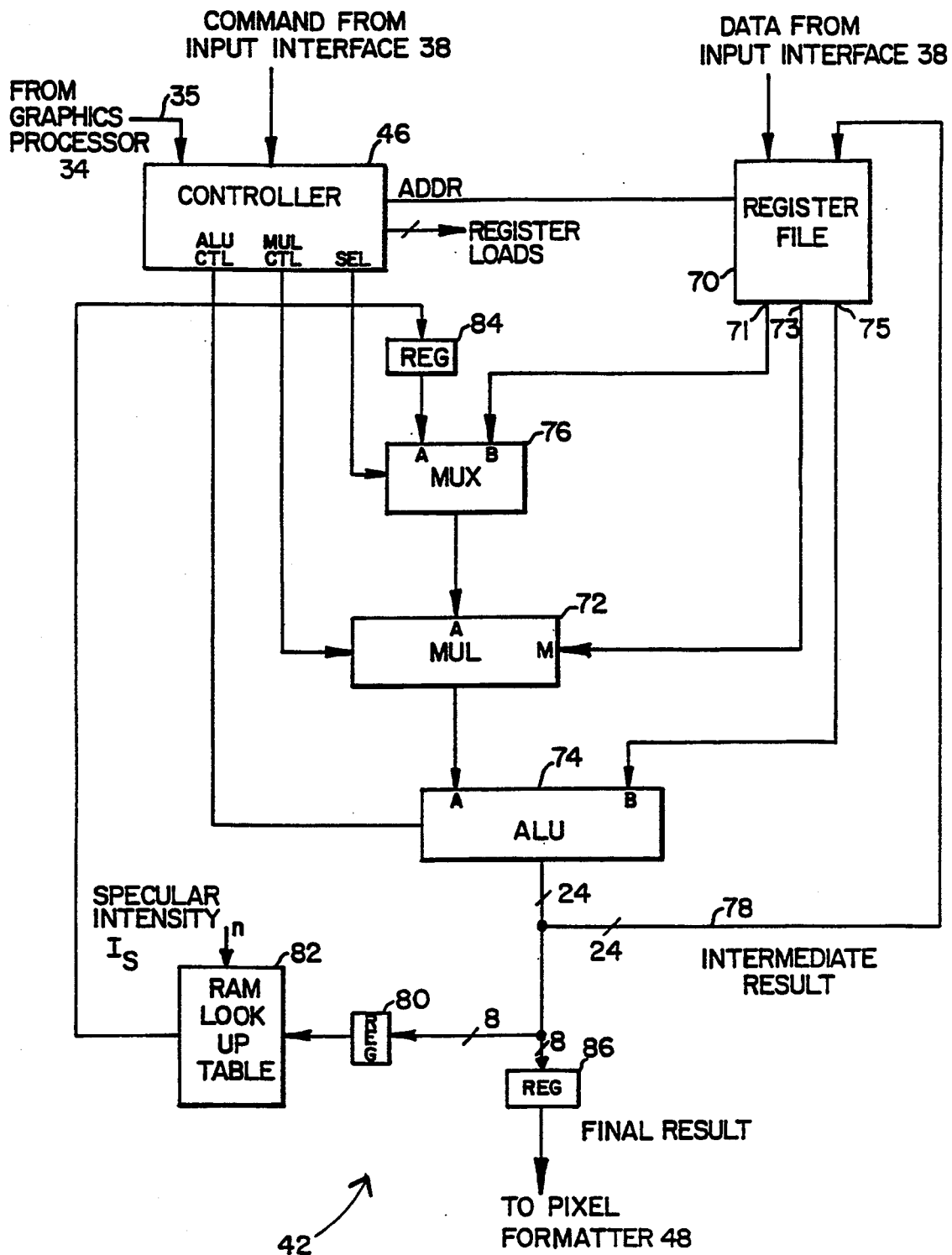
FIG. 3 is a block diagram of a section of the pixel processors of FIG. 1.

The invention provides a scheme of computing and normalizing each pixel normal vector using a series expansion to approximate $1/\sqrt{\eta}$ to the required accuracy for multiplication with pixel normal vector N(x,y) (equation 4) and use in the illumination model of equation (1) when used with 8-bit pixel intensity. Thus, each pixel normal vector is normalized through a series of simple, rapidly performed mathematical operations (i.e., multiplication and addition/subtraction operations for evaluating the series expansion) in place of the relatively complex operations of calculating the square root of $\eta$ and dividing that quantity into N(x,y). This allows the Phong shading algorithm to be evaluated in "real-time" for each pixel using, for example, fixed point hardware (as shown in FIG. 3, discussed in detail below).

One series expansion for approximating $1/\sqrt{\eta}$ is the one-dimensional Taylor series expansion of $1\sqrt{\eta}$ around center 1. This expansion, $T(\eta)$, is expressed as:

$$T(\eta) = 1 + (\tfrac{1}{2})(1-\eta) + (\tfrac{3}{8})(1-\eta)^2 + (5/16)(1-\eta)^3 + (35/128)(1-\eta)^4 \quad (5)$$

Another series expansion for evaluating $1/\sqrt{\eta}$ is the Chebyshev polynomial approximation of $1/\sqrt{\eta}$ which is expressed as:

$$C(\eta) = 1 + 0.466059(1-\eta) + 0.614257(1-\eta)^2 \quad (6)$$

Either the Taylor series or Chebyshev approximation (or other approximations) for $1/\sqrt{\eta}$ may be used. As discussed in detail below, the Chebyshev polynomial provides the same approximation accuracy as the Taylor series with two fewer coefficients (i.e., three coefficients instead of five). The coefficients of the Chebyshev expansion are more difficult to calculate than those of the Taylor series. However, as discussed in detail below, the calculation of the coefficients is transparent to the user of system 10, because the coefficients are pre-computed and programmed into graphics processor 34, which uses the coefficients to (approximate $1/\sqrt{\eta}$ for every pixel in every triangle used to create Phong shading of any image created by system 10.

It is noted that the Taylor series may alternatively be centered around another number to improve the approximation accuracy, because the accuracy of both series increases with increasing closeness of the center and result. For example, a center of $\alpha$ may provide more accuracy; the corresponding Taylor series is expressed as:

$$T(\eta) = 1 + (-1/2)(\alpha)^{-3/2}(\eta - \alpha) + \quad (5a)$$
$$(3/8)(\alpha)^{-5/2}(\eta - \alpha) + (-5/16)(\alpha)^{-7/2}(\eta - \alpha) +$$
$$(35/128)(\alpha)^{-9/2}(\eta - \alpha)$$

Referring to FIG. 3, each pixel processor channel 40, 42, 44 (for example, red channel 42) comprises a 24 bit by 32 line register file 70, a fixed-point multiplier (MUL) 72 and a fixed point, 24 bit arithmetic logic unit (ALU) 74 for calculating and normalizing each pixel normal and evaluating illumination equation (1) for each pixel 66 using its normalized normal vector N. Specifically, register file 70 receives the constants of equation (1) (i.e., $I_a$, $K_d$, L, H, $K_s$), pixel data (such as vertex normals N), the series expansion coefficients and triangle interpolation constants (i.e., A, B, C from equation (3)) computed as preprocessing steps by graphics processor 34. These quantities and their calculation are discussed in detail below. One output 71 of register file 70 is connected to the "B" inputs of multiplexers (MUXes) 76, 77. The output of MUX 76 is applied as the "A" operand to MUL 72. The "M" operand of MUL 72 is provided by register file output 73. The (product of operands A and M produced by MUL 72 is applied to the "A" input of MUX 77. The output of MUX 77 is connected to the "A" input of ALU 74, the input of which is supplied by output 75 of register file 70. MUXes 76, 77, MUL 72, and ALU 74 are controlled by controller 46 in response to commands from graphics processor 34, either via input interface 38 or directly on bus 35.

The 24 bit output of ALU 74 is fed back on line 78 to register file 70 to store intermediate results of the pixel normal calculation, normalization operation, and evaluation of the remainder of illumination equation (1). Eight bits of the output of ALU 74 (for example, the most significant 8 bits of the intensity value of the output of ALU 74) are applied via register 80 to address look-up table 82, which is a memory device (such as RAM) containing results of the addresses raised to the power of n for determining the specular intensity $I_s$ (equation (1)). The output of look-up table 82 (i.e., representative of $(N \cdot H)^n$) is applied via register 84 to the "A" input of MUX 76.

The 24-bit output of ALU 74 is also coupled to register 86, which is used to temporarily store the final results of illumination equation (1) for a given pixel 66 for subsequent application to pixel formatter 48 (FIG. 1). Registers 80, 84, 86 are loaded under the direction of controller 46.

In operation, an image of an object created by host processor 12 is shaded as follows. Initially, host processor 12 selects the appropriate glossiness degree, n, for the image and loads data corresponding to the exponential function of each table address raised to the nth power into look up table 82. Host processor 12 also provides graphics processor 34 with a light vector L (including components $L_x$, $L_y$, $L_z$) and a direction of sight vector s (having $s_x$, $s_y$, and $s_z$ components). Vector s is normalized and is the same for every pixel in every triangle of a given image, as is vector L for a point light source located an infinite distance from the imaged object. From L and s, graphics processor 34 calculates a single H for use in equation (1) for every pixel. Host processor also stores the ambient light intensity ($I_a$) for the image in graphics processor 34.

Figure 4:
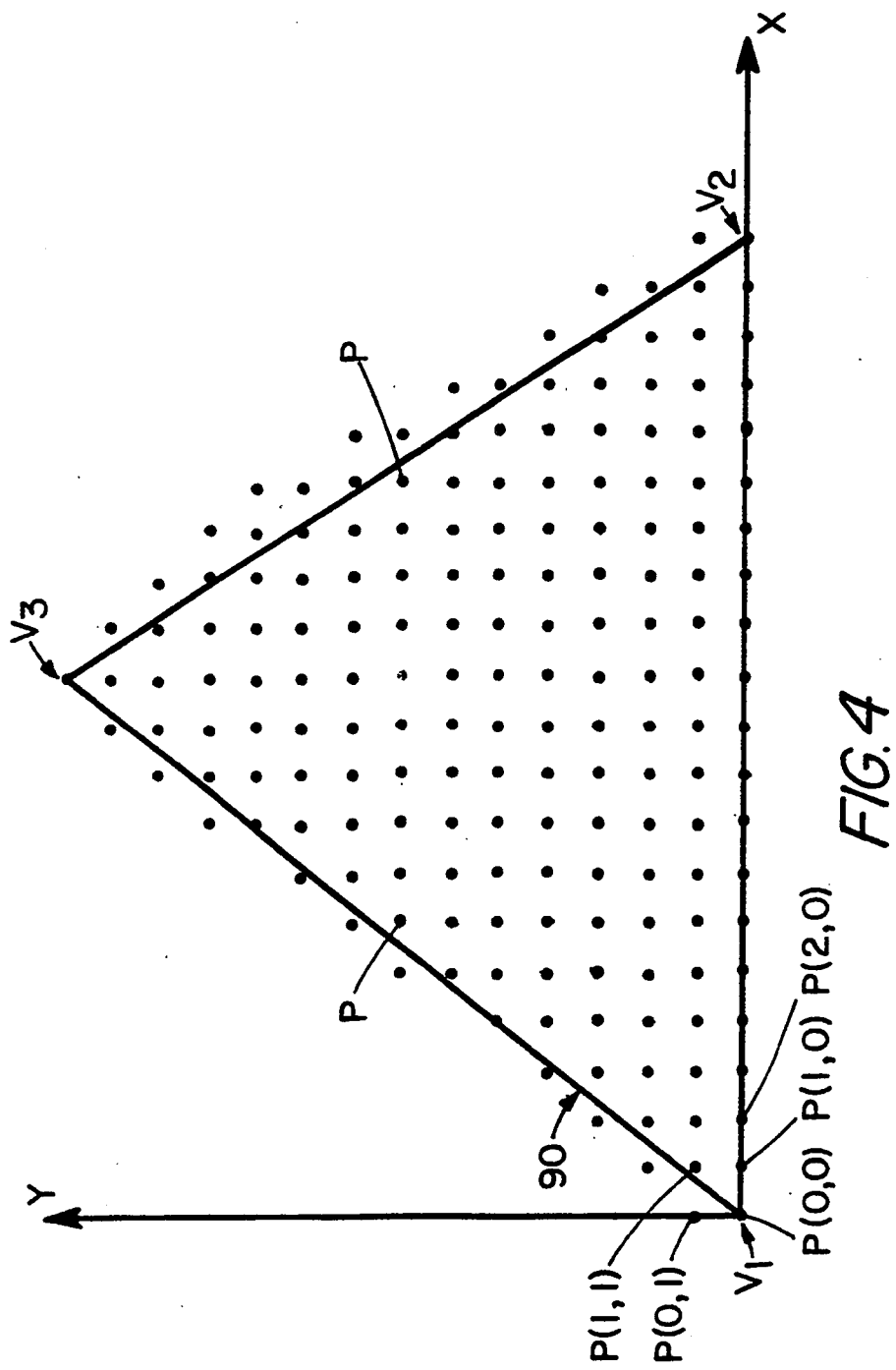
FIG. 4 is a diagram of a display triangle in a field of pixels useful in understanding the invention.

Referring to FIG. 4, to generate and shade a portion of a surface of the object represented by triangle 90, host processor 12 sends graphics processor 34, via the remainder of image display pipeline 18, the coordinates of the vertices $V_1$, $V_2$, $V_3$ of triangle 90. Host processor 12 also calculates the directions of the normal vectors $N_1$, $N_2$, $N_3$ of vertices $V_1$, $V_2$, $V_3$, respectively, and sends them to graphics processor 34.

Graphics processor 34 then calculates the vector-based term $$D = K_d(N \cdot L) \tag{7}$$

of equation (1) for each vertex $V_1$, $V_2$, $V_3$, using the corresponding vertex normal (e.g., $D_1 = K_d(N_1 \cdot L)$). Graphics processor 34 also uses each vertex normal to calculate the vector-based term $$S = N \cdot H \tag{8}$$

for the corresponding vertices $V_1$, $V_2$, $V_3$ (e.g., $S_1 = N_1 \cdot H$). Because L (and hence H) are constant for a point light source located an infinite distance from the object being imaged, the terms D, S for vertices $V_1$, $V_2$, $V_3$ are linear functions of the x, y pixel display coordinate system. Thus, graphics processor 34 calculates the interpolation constants A, B, C of equation (3) for bilinearly interpolating D and S over every pixel P in triangle 90. The interpolation constants of equation (3) for bilinearly interpolating $D_1$, $D_2$, $D_3$ are denoted as $A_D$, $B_D$, $C_D$, and the constants for interpolating $S_1$, $S_2$, $S_3$ are referred to as $A_S$, $B_S$, $C_S$. To put it another way, rather than bilinearly interpolating $N_1$, $N_2$, $N_3$ over every pixel P in triangle 90 and then multiplying each interpolated normal by L and H to achieve D and S for each pixel, the values of D and S at the vertises are bilinearly interpolated. This reduces the number of multiplication operations that each channel 40, 42, 44 needs to perform. Bilinear interpolation constants $A_D$, $B_D$, $C_D$, $A_S$, $B_S$, $C_S$ are loaded in register files 70 of red, green, and blue channels 40, 42, 44 in pixel processor 36. Graphics processor 34 also loads the value of D and S at each vertex $V_1$, $V_2$, $V_3$ into register files 70.

Graphics processor 34 also calculates $\eta$ (i.e., the square of the magnitude) of each vertex normal $N_1$, $N_2$, $N_3$ simply by adding the squares of the x, y, and z components thereof. For example, $\eta_1$ (i.e., $\eta$ for vector $V_1$) equals $N_{1x}^2 + N_{1y}^2 + N_{1z}^2$. Because both the Taylor series and Chebyshev polynominal operate on $(1-\eta)$, graphics processor 34 creates a new quantity, $\mu$, for each vertex equal to $(1 - \eta_{vertex})$. Thus, $\mu_1$, $\mu_2$, $\mu_3$ for respective vertices $V_1$, $V_2$, $V_3$ are calculated by graphics processor 34 as:

$$\mu_1 = [1 - (N_{1x}^2 + N_{1y}^2 + N_{1z}^2)] \tag{9a}$$

$$\mu_2 = [1 - (N_{2x}^2 + N_{2y}^2 + N_{2z}^2)] \tag{9b}$$

$$\mu_3 = [1 - (N_{3x}^2 + N_{3y}^2 + N_{3z}^2)] \tag{9c}$$

Quantities $\mu_1$, $\mu_2$, $\mu_3$ are loaded in register files 70 of each channel 40, 42, 44 for use in evaluating the power series approximation of $1/\sqrt{\eta}$ for each pixel P in the manner discussed below. Thus, the Taylor series (equation (5)) executed in each channel for each pixel is actually:

$$t(\mu) = 1 + (\tfrac{1}{2})\mu + (\tfrac{3}{8})\mu^2 + (5/16)\mu^3 + (35/128)\mu^4 \tag{10}$$

where $\mu$ corresponds to the value of $(1-\eta)$ for the pixel (i.e., one minus the square of the magnitude of the interpolated normal vector at that pixel).

From the values of vertex normals $N_1$, $N_2$, $N_3$, graphics processor 34 approximates, by bilinear interpolation, the normals of pixels P(0,1), P(1,0), and P(1,1), as shown in FIG. 4. Graphics processor 34 then calculates $\mu(0,1)$, $\mu(1,0)$, $\mu(1,1)$ from these normals in the manner discussed above with respect to equations 9a-9c (e.g. $\mu(0,1) = [1 - N_{(0,1)x}^2 + N_{(0,1)y}^2 + N_{(0,1)z}^2])$ and loads these values into register files 70. It is noted that the quantity $\mu$ for vertex $V_1$ (i.e., $\mu(0,0)$ at pixel P(0,0)) has previously been determined as $\mu_1$. These calculations are used to provide channels 40, 42, 44 with sufficient information to approximate the value of $\mu$ for every other pixel P by biquadratic interpolation. That is, by knowing the quantities $\mu(0,0)$, $\mu(0,1)$, $\mu(1,0)$, $\mu(1,1)$, each channel 40, 42, 44 uses the "second forward difference" method to approximate the values of $\mu$ for all other pixels. The second forward difference equation is expressed as:

$$\mu_m = 2\mu_{(m-2)} - \mu_{(m-1)} + \Delta\mu \tag{11}$$

where: $\mu_m$ is the value of $\mu$ for the pixel, $P_m$, of interest; $\mu_{(m-1)}$ is the value of $\mu$ for the immediately preceeding pixel, $P_{(m-1)}$; $\mu_{(m-2)}$ is the value of $\mu$ for the second preceeding pixel $P_{(m-2)}$; and $\Delta\mu$ is an interpolation constant determined by graphics processor 34 based on $\mu_1$, $\mu_2$, $\mu_3$, For example, the value of $\mu$ for pixel P(2,0) (i.e., $\mu(2,0)$) is:

$$\mu(2,0) = (2\mu(0,0) - \mu(1,0) + \Delta\mu \tag{12}$$

These second forward difference operations are performed in channels 40, 42, 44 in a manner described in detail below.

Referring again to FIG. 3, each channel 40, 42, 44 calculates the intensity I of each pixel according to equation (1) in the following manner. Each channel uses the constants (i.e., $I_a$, $K_d$, $K_s$, n), the quantities $D_1$–$D_3$, $S_1$–$S_3$, $A_D$, $B_D$, $C_D$, $A_S$, $B_S$, $C_S$, $\mu(0,0)$–$\mu(1,1)$, and the Taylor series coefficients, all supplied by graphics processor 34 and loaded in register file 70, for the triangle in which the pixel is located. First, the value of $\mu$ for that pixel is biquadratically interpolated according to second forward difference equation (11). Taking pixel P(2,0) as an example, register file 70 is addressed by controller 46 to produce $\mu(0,0)$ (i.e., the value of $\mu$ for the second preceeding pixel P(0,0)) at output 71. Controller 46 selects the "B" input of MUX 76 to couple $\mu(0,0)$ to MUL 72. Controller 46 also addresses the location in register file 70 containing a pre-loaded value of 2, which is applied via output 73 to MUL 72 and multiplied with $\mu(0,0)$. The result is applied to the "A" input of ALU 74 via MUX 77. Controller 46 simultaneously addresses the location in register file 70 which contains $\mu(1,0)$ (the value of $\mu$ for immediately preceeding pixel P(1,0)), and $\mu(1,0)$ is applied via output 75 to the "B" input of ALU 74. Controller 46 directs ALU 74 to substract $\mu(1,0)$ from $2\mu(0,0)$. The result is fed back to register file 70 and applied to ALU 74 input B. Controller 46 then directs register file 70 to apply interpolation constant $\Delta\mu$ to output 71. Controller 46 selects the "B" input of MUX 77 to couple AM to the "A" input of ALU 74. Controller 46 directs ALU 74 to add inputs A and B. The result represents the interpolated value of $\mu(2,0)$, and is temporarily stored in register file 70.

The next step is to execute Taylor series expansion equation (10) for $\mu(2,0)$. A little thought reveals that equation (10) can be rewritten as follows:

$$T(\mu)=1+\mu(\tfrac{1}{2}+\mu(\tfrac{3}{8}+\mu(5/16+35/128\mu))) \qquad (13)$$

Each channel 40, 42, 44 evaluates equation (13) for each interpolated value of p (e.g., $\mu(2,0)$) starting with the operation in the innermost set of parentheses and working outward. Thus, $\mu(2,0)$ is applied to the "A" input of MUL 72, and coefficient (35/128) is coupled to MUL 72 input M. Their product is applied to ALU 74 input A, and coefficient (5/16) is coupled to ALU input B by register file 70. Controller 46 directs ALU 74 to add its A and B inputs, and the resulting output of ALU 74 is fed back to input M of MUL 72 via register file 70. Register file 70 continues to apply $\mu(2,0)$ to input A of MUL 76 and couples coefficient ($\tfrac{3}{8}$) to input B of ALU 74. The result computed by MUL 72 and ALU 74 is again applied to MUL 72 input M via feedback path 78 for multiplication with $\mu(2,0)$ and application to ALU input A. Register file 70 applies coefficient ($\tfrac{1}{2}$) to ALU input B. The resulting output of ALU 74 represents the solution of equation (13) through the outermost set of parenthesis. This result is fed back through register file 70 to the M input of MUL 72, where it is multiplied by $\mu(2,0)$ and applied to ALU 74 input A. Register file 70 applies the coefficient (1) to ALU input B for addition with input A. The resulting output of ALU 74 represents The Taylor series approximation of $1/\sqrt{\eta}$ for normalization of the interpolated normal of pixel P(2,0). This result is temporarily stored in register file 70.

Next, the quantities D (i.e., $K_d(N\cdot L)$) and S (i.e., $N\cdot H$) are computed for the pixel of interest (e.g., pixel P(2,0)). Quantities D, S are calculated for every pixel in the triangle by bilinear interpolation (equation (3)) of the D and S quantities of the three vertices of the triangle. The bilinear interpolation uses $A_D$, $B_D$, $C_D$ as interpolation constants for D and $A_S$, $B_S$, $C_S$ as interpolation constants for S. Thus, the values of D, S at a given pixel P(x,y) in the triangle are given as:

$$D(P(x,y))=A_D x+B_D Y+C_D \qquad (14)$$

$$S(P(x,y))=A_S x+B_S y+C_S \qquad (15)$$

Referring also to FIG. 4, pixels P(x,y) disposed along the x-axis for a given position on the y-axis are located on the same scan line. Thus, pixels P(0,0), P(1,0), and P(2,0) are all on scan line 96, while scan line 98 contains pixels P(0,1), P(1,1), and P(2,1). Because D and S are linear quantities, the values of D and S for a pixel on a given scan line (e.g., pixel P(1,0)) are found simply by adding the x-direction interpolation constants $A_D$, $A_S$, respectively, to the values of D and S, respectively, of the immediately preceeding pixel on that scan line (e.g., pixel P(0,0)), the D and S values of which have previously been calculated. (e.g., by graphics processor 34 for pixel P(0,0)). Likewise, The values of D and S for a pixel (e.g., pixel P(0,1) located on an adjacent scan line from a pixel (e.g., pixel P(0,0)) whose D and S values are already known, are found simply by adding y-direction interpolation constants $B_D$, $B_S$, respectively, to The respective D and S values of the previous pixel. This process is performed in each channel 40, 42, 44 for each pixel P(x,y). Each time new D and S quantities are calculated, they are stored in register file 70 for use in computing the values of D and S for the next pixel.

For example, calculation of D for pixel P(2,0) is performed by reading the value of D for pixel P(1,0) (i.e., the immediately preceeding pixel on scan line 96) from register file 70 and applying it to input A of ALU 74 via MUX 77, while applying $A_D$ to ALU 74 input B. The two quantities are added and are stored in register file 70 as the value of D(P(2,0)). Identical steps are used with constant $A_S$ to calculate the value of S(P(2,0)). It is noted that if it were desired to calculate the D and S quantities for pixel P(2,1) from those of pixel P(2,0), the value of D for pixel P(2,0) would be read from register file 70 and applied, via mux 77, to the A input of ALU 74, and interpolation constant $B_D$ applied to ALU input B. These quantities are added and the new value of D for pixel P(2,1) is stored in register file 70. Identical steps, substituting interpolation constant $B_S$ for $B_D$, are used to calculate the value of S for pixel P(2,0).

The normalization of the interpolated values of D and S for each pixel P(x,y), for example, pixel P(2,0), proceeds as follows. Each channel 40, 42, 44 normalizes the interpolated values of D(P(2,0)) and S(P(2,0)) by multiplying Them by the approximation of $1/\sqrt{\eta}$ for P(2,0) obtained from the Taylor series expansion. First, S(P(2,0)) is applied to MUL 72 input A via MUX 76 and the approximation of $1/\sqrt{\eta}$ applied to MUL input B. The product, which represents the normalized value of the normal at pixel P(2,0) already multiplied by vector H (equation (8)), is coupled through MUX 77 and ALU 74 and fed back to register file 70. This result is 24 bits wide. Eight bits of the result are loaded in register 80 to provide the address for look up table 82. Then, D(P(2,0)) is applied to MUL 72 input A while maintaining $1/\sqrt{\eta}$ at input M. The resulting product represents an approximation of the normalized value of the normal at pixel P(2,0) already multiplied by vector L and $K_d$ (i.e., $I_d$—equation (7)). To save an additional feedback cycle, $I_d$ is added to $I_a$ in ALU 74 and the result temporarily stored in register file 70.

As D(P(2,0)) is being normalized, $(N \cdot H)^n$ is being found in look-up table 82 from the normalized value of S(P(2,0)) stored in register 80. That is, S(P(2,0)) is raised to the power of n by look-up table 82, and the result is stored in register 84. This result is coupled through MUX 76 to MUL 72 input A. Specular factor $K_s$ is applied to the M input of MUL 72. The resulting product represents the specular intensity, $I_s$, for pixel P(2,0) and is applied to ALU input A. The sum $(I_a+I_d)$ is read from register file 70 and applied to ALU input B for addition with $I_s$. The resulting output of ALU 74 is a 24-bit word representing the final Phong shaded intensity value, I, for pixel P(2,0), and is loaded in register 86 for subsequent application to pixel formatter 48.

This procedure is repeated in channels 40, 42, 44 for every other pixel P(x,y) in triangle 90, using the constants provided for the triangle by graphics processor 34 and the interpolated values of $\mu$, D and S for one or more previously-evaluated pixels in accordance with the interpolation formulas discussed above. As the intensities of all pixels P in triangle 90 are being calculated, host processor 12 applies information about the next triangle to be shaded to graphics processor 34, which calculates new quantities (i.e., $D_1$–$D_3$, $S_1$–$S_3$, $A_D$, $B_D$, $C_D$, $A_S$, $B_s$, $C_s$ and, $\mu(0,0)-\mu(1,1)$) for that triangle. The Taylor series coefficients are constant, however, and need not be recomputed for each triangle.

As discussed above, ALU 74 is a 24-bit device, and thus each final pixel intensity I is a 24-bit digital word. However, here only the most significant 8 bits of the intensity value of the word are used. This is because errors are accumulated in the intermediate results due to the bilinear interpolations of D and S, the biquadratic interpolation of $\mu$ and the approximation of $1/\sqrt{\eta}$. These errors require the calculation of I with a greater precision (e.g., 24 bits) than the 8 bits used in the final result. To support an 8-bit intensity for each channel, the error ($e(\eta)$) introduced by the Taylor series approximation of $1/\sqrt{\eta}$ should be less than $2^{-8}$. That is:

$$e(\eta)=1/\sqrt{\eta}-T(\eta)<2^{-8}$$

In order for this to be true for a 5-term Taylor series approximation, the maximum angle, $\theta$, between any two vertex normals of the triangle containing the pixel is 78°. The maximum angle varies as shown in Table I below in accordance with the number of terms in the series expansion and the number of bits in the final intensity result applied to pixel formatter 48.

TABLE I

| Number of Terms | 8-bit | 9-bit | 10-bit | 11-bit |
|---|---|---|---|---|
| 5 | 78° | 72° | 67° | 62° |
| 4 | 70° | 62° | 57° | 52° |
| 3 | 55° | 49° | 44° | 39° |
| 2 | 39° | 30.5° | 25.7° | 21.5° |
| 1 | 10° | 7° | | |

Other embodiments are within the scope of the claims. For example, referring again to equation (1), the present invention is also applicable when multiple light sources are used. In this case, graphics processor 34 calculates D=(N·L) and S=(N·H) for each light vector and for each vertex of the triangle. The D and S terms for the verticies are bilinearly interpolated to approximate D and S for each light vector at each pixel. Each value of D and S is normalized using the Taylor (or Chebyshev) series approximation discussed in detail above. It is noted that for a given pixel, a single approximation of $1/\sqrt{\eta}$ is used for normalizing the values of D and S for each light vector. For example, as the value of N·L is interpolated for each light source for a given pixel, it is normalized by multipication (in MUL 72) with the approximation of $1/\sqrt{\eta}$ for that pixel, and the result stored in register file 70. Then, these normalized quantities are added (using ALU 74) and the result multiplied by $K_d$ to yield the diffuse intensity $K_d \Sigma$ (N·L). The same procedure is followed for the values of N·H for the several light sources.

The invention may also be used for normalizing vectors other than normal vectors, for example vectors associated with a light source (or sources) located a finite distance from the imaged object. In this case, each light vector L, rather than being normalized and constant for every triangle comprising the image, has different values for each pixel in the image. Host processor 12 provides graphic processor 34 with non-normalized light vectors $L_1$, $L_2$, $L_3$ for the three verticies of each triangle. Graphics processor 34 calculates N·L for each vertex of the polygon (i.e., $N_1 \cdot L_1$, $N_2 \cdot L_2$, $N_3 \cdot L_3$) and uses these quantities to determine N·L for pixels P(1,0), P(0,1), and P(1,1). This is done because N·L for a light source at a finite distance is a quadratic, rather than linear, function of x and y, and thus must be biquadratically interpolated (using the second forward difference method of equation (11)), rather than bilinearly interpolated, to determine N·L at the other pixels associated with the triangle. Each channel performs this biquadratic interpolation in the same manner as discussed above.

Also, both N and L are normalized for each pixel by multiplying N·L by the Taylor (or Chebyshev) approximation of $1/\sqrt{\eta}$ and the Taylor or Chebyshev approximation of $1/\sqrt{\eta'}$ (where $\eta'=L_x^2+L_y^2+L_z^2$). The approximation of $1/\sqrt{\eta}$ (i.e., to normalize the normal vector N) is determined in the same manner discussed above. To approximate $1/\sqrt{\eta'}$, graphics processor 34 calculates $[1-(L_x^2+L_y^2+L_z^2)]$ (i.e., $\mu'$) for each of pixels P(0,1), P(1,0), P(1,1). This enables each channel 40, 42, 44 to calculate each $\mu'$ of the other pixels in the triangle by the second forward difference method of equations (11) and (12). The resultant value of $\mu'$ for each pixel is inserted into the Taylor series of equation (13) to derive the approximation of $1/\sqrt{\eta'}$ for the light vector for that pixel.

Then, N·L is multiplied (in MUL 72) by the approximation of $1/\sqrt{\eta}$, and this product is multiplied by the approximation of $1/\sqrt{\eta'}$. The result is the normalized value of N·L, which is then evaluated in equation (1).

This same procedure is used to determine and normalize N·H for each pixel.

It is important to note that the normalization of L (and H) for a light source located at a finite distance is executed by the same hardware (i.e., register file 70, MUL 72, ALU 74, MUXes 76, 77) used to interpolate and normalize pixel normal vectors. Also, the series expansion coefficients (Taylor or Chebyshev) are the same, regardless of whether N, L, or H is being normalized.

We claim:

1. A computer graphics method for producing an image of an object on a display device based on a description of said object by representing a surface of the object as a plurality of polygons and producing each polygon by generating display pixels having various intensity levels on the display device in accordance with a lighting model that takes into account a position and orientation of an imaginary light source with to a position and orientation of said surface, said method comprising the steps of:

(a) receiving a description of said object;

(b) generating data that is based on said description and that defines each polygon, said data including vector-based terms from which the intensity levels for the display pixels that are associated with said polygon can be derived, said vector-based terms being determined from predetermined vectors at vertices of said polygon that define the position and orientation of a portion of said surface being represented by said polygon;

(c) processing said data in accordance with said lighting model to determine the intensity levels at which said display pixels will be generated on said display device to cause said image to visually resemble said object, said processing including evaluating said lighting model in accordance with said vector-based terms and producing for each said display pixel an intensity signal that represents the intensity level for said pixel as a result of said evaluation; and (d) generating said display pixels on said display device at intensity levels defined by said intensity signals to produce said image that visually resembles said object;

(e) wherein said processing further includes determining, from said predetermined vectors at the vertices of each polygon, the square ($\eta$) of the magnitude of a vector associated with each said vector-based term for each said display pixel that is associated with said polygon, approximating $1/\sqrt{\eta}$ for each said vector-based term using a series expansion that includes $\eta$ but excludes said vector-based term, and combining each said vector-based term with the corresponding approximation of $1/\sqrt{\eta}$ to produce a normalized vector-based term for each display pixel, said normalized vector-based term being used during said evaluation of said lighting model for said display pixel.

2. The method of claim 1 wherein said approximating and combining are carried out by a multiplier and an adder controlled by a pixel processor controller.

3. The method of claim 2 wherein said approximating includes successive multiplications and additions by said multiplier and said adder.

4. The method of claim 1 wherein said determining includes performing biquadratic interpolation based on the squares of the magnitudes of said predetermined vectors at the vertices of said polygon.

5. The method of claim 1 wherein said vectors are normal vectors (N) that are normal to the surface of said object.

6. The method of claim 5 further comprising providing said vector-based terms by obtaining dot products of said normal vectors (N) with other said vectors.

7. The method of claim 6 wherein said other vectors are light vectors (L) representing the direction of a point light source with respect to the object so that said vector-based terms are each represented by (N·L).

8. The method of claim 7 further comprising multiplying each one of said normalized vector-based terms represented by (N·L) times a diffuse factor ($K_d$) to obtain the intensity ($I_d$) of diffuse reflection of light at said each display pixel.

9. (Amended) The method of claim 8 further comprising obtaining the dot products of said normal vectors (N) with specular reflection vectors (H) relating to light vectors (L) representing the direction of a point light source with respect to the object and to sight vectors (s) of a line of sight with respect to the object to obtain normalized vector-based terms represented by (N·H), raising each one of said normalized vector-based terms represented by (N·H) to the $n^{th}$ power, where n is a glossiness degree, multiplying the result times a specular factor ($K_s$) to obtain the intensity ($I_s$) of specular reflection of light at each said display pixel, and adding said intensity of specular reflection of light ($I_s$) to said intensity ($I_d$) of diffuse reflection of light and to the intensity ($I_a$) of ambient light.

10. The method of claim 6 wherein said other vectors are specular reflection vectors (H) relating to light vectors (L) representing the direction of a point light source with respect to the object and to sight vectors (s) of a line of sight with respect to the object so that said vector-based terms are each represented by (N·H).

11. The method of claim 10 further comprising raising each one of said normalized vector-based terms represented by (N·H) to the $n^{th}$ power, where n is a glossiness degree, and multiplying the result times a specular factor ($K_s$) to obtain the intensity ($I_s$) of specular reflection of light at said each display pixel.

12. The method of claim 6, 8, 11, or 9 wherein said approximating, combining, and obtaining dot products are carried out by a fixed-point multiplier and a fixed-point adder controlled by a pixel processor controller.

13. The method of claim 5 wherein said vector-based terms are said normal vectors (N).

14. The method of claim 1 wherein said vectors are light vectors (L) representing the direction of a point light source with respect to the object.

15. The method of claim 14 wherein said vectors are light vectors (L) representing the directions of a plurality of point light sources with respect to the object, each light source having predetermined light vectors associated therewith at the vertices of said polygon, and further comprising determining, from the predetermined light vectors of each light source at the vertices of the polygon, a corresponding plurality of light vectors for each display pixel, determining, from the predetermined light vectors of each light source at the vertices of the polygon, the square ($\eta$) of the magnitude of the plurality of light vectors for each display pixel, approximating $1/\sqrt{\eta}$ for each one of the plurality of light vectors for each display pixel using a series expansion employing the corresponding value of $\eta$, multiplying each light vector of each display pixel by the corresponding approximation of $1/\sqrt{\eta}$ to produce a plurality of normalized light vectors at each display pixel, and adding the plurality of normalized light vectors of each display pixel to obtain a single normalized light vector for each display pixel.

16. The method of claim 1 wherein said expansion comprises a Taylor series expansion.

17. The method of claim 1 wherein said expansion comprises a Chebyshev polynomial approximation.

18. A computer graphics method for producing a shaded image of an object having at least one curved surface on a display device based on a description of the object by representing said curved surface as a plurality of adjoining polygons and producing each polygon by generating display pixels having various intensity levels on the display device in accordance with a lighting model that takes into account a position and orientation of an imaginary light source with respect to a position and orientation of said surface, said method comprising the steps of:

receiving a description of said object;

generating data that is based on said description and that defines each polygon, said data including vector-based terms from which the intensity levels for the display pixels that are associated with said polygon can be derived, said vector-based terms being determined from predetermined vectors at vertices of said polygon that define the position and orientation of a portion of said surface being represented by said polygon;

processing said data in accordance with said lighting model to determine the intensity levels at which said display pixels will be generated on said display device to cause said shaded image to visually resemble said object, said processing including evaluating said lighting model in accordance with said vector-based terms and producing for each said display pixel an intensity signal that represents a shaded intensity level for said pixel as a result of said evaluation; and generating said display pixels on said display device at intensity levels defined by said intensity signals to produce said shaded image that visually resembles said object;

wherein said processing further includes determining, from said predetermined vectors at the vertices of each polygon, the square ($\eta$) of the magnitude of a vector associated with said vector-based term for each said display pixel that is associated with said polygon, approximating $1/\sqrt{\eta}$ for each said vector-based term using a series expansion that includes $\eta$ but excludes said vector based term, and combining each said vector-based term with the corresponding approximation of $1/\sqrt{\eta}$ to produce a normalized vector-based term for each display pixel, said normalized vector-based term being used during said evaluation of said lighting model for said display pixel.

19. Computer graphics apparatus for producing a shaded image of an object having at least one curved surface on a display device based on a description of the object in accordance with a lighting model that takes into account a position and orientation of an imaginary light source with respect to a position and orientation of said surface, comprising a host computer system for receiving and storing said description, said host computer system including means for representing said curved surface as a plurality of adjoining polygons each of which contains display pixels and has vectors at vertices thereof that define the position and orientation of a portion of the curved surface being represented by said polygon, and means for generating data that describes each polygon, said data including vector-based terms from which intensity levels for the display pixels in said polygon can be derived, said vector-based terms being derived from said vectors, a graphics processor system for processing said data in accordance with said lighting model to determine the intensity levels at which said display pixels will be generated on said display device to cause said shaded image to visually resemble said object, said graphics processor system including means for evaluating said lighting model in accordance with said vector-based terms and producing for each said display pixel an intensity signal that represents a shaded intensity level for said pixel as a result of said evaluation, a frame buffer for storing the intensity signals produced by said graphics processor, system and means for applying said intensity signals from said frame buffer to said display device to cause said display device to generate said display pixels at intensity levels defined by said intensity signals and produce said shaded image that visually represents said object, wherein said graphics processor system further includes means for determining, from said vectors at the vertices of each polygon, the square ($\eta$) of the magnitude of a vector associated with said vector-based term for each said display pixel that said polygon contains, means for approximating $1/\sqrt{\eta}$ for each said vector-based term using a series expansion that includes $\eta$ but excludes said vector based term, and means for combining each said vector-based term with the corresponding approximation of $1/\sqrt{\eta}$ to produce a normalized vector-based term for each said display pixel, said normalized vector-based term being used during said evaluation of said lighting model for said display pixel.

20. The apparatus of claim 19 wherein said means for approximating and said means for combining comprise a multiplier and an adder controlled by a pixel processor controller.

21. The apparatus of claim 20 wherein said means for approximating and said means for combining further comprise a register for storing intermediate values and said pixel processor controller includes means for making successive multiplications by said multiplier and successive additions by said adder and for storing intermediate values in and reading them from said register.

22. The apparatus of claim 19 wherein said means for determining includes means for performing biquadratic interpolation based on the squares of the magnitudes of said predetermined vectors at the vertices of said polygon.

23. The apparatus of claim 19 wherein said vectors are normal vectors (N) that are normal to the surface of said object.

24. The apparatus of claim 23 wherein said graphics processor system includes means for providing said vector-based terms by obtaining dot products of said normal vectors (N) with other vectors.

25. The apparatus of claim 24 wherein said other vectors are light vectors (L) representing the direction of a point light source with respect to the object so that said vector-based terms are each represented by (N·L).

26. The apparatus of claim 25 wherein said graphics processor system includes means for multiplying each one of said normalized vector-based terms represented by (N·L) times a diffuse factor ($K_d$) to obtain the intensity ($I_d$) of diffuse reflection of light at said each display pixel.

27. The apparatus of claim 26 wherein said graphics processor system includes
means for obtaining the dot products of said normal vectors (N) with specular reflection vectors (H) relating to light vectors (L) representing the direction of a point light source with respect to the object and to sight vectors (s) of a line of sight with respect to the object to obtain normalized vector-based terms represented by (N·H),
means for raising each one of said normalized vector-based terms represented by (N·H) to the $n^{th}$ power, where n is a glossiness degree,
means for multiplying the result times a specular factor ($K_s$) to obtain the intensity ($I_s$) of specular reflection of light at each said display pixel, and
means for adding said intensity of specular reflection of light ($I_s$) to said intensity ($I_d$) of diffuse reflection of light and to the intensity ($I_a$) of ambient light.

28. The apparatus of claim 24 wherein said other vectors are specular reflection vectors (H) relating to light vectors (L) representing the direction of a point light source with respect to the object and to sight vectors (s) of a line of sight with respect to the object so that said vector based terms are each represented by (N·L).

29. The apparatus of claim 28 wherein said graphics processor system includes means for raising each one of said normalized vector-based terms represented by (N·H) to the $n^{th}$ power, where n is a glossiness degree, and means for multiplying the result times a specular factor ($K_s$) to obtain the intensity ($I_s$) of specular reflection of light at said each display pixel.

30. The apparatus of claim 29 wherein said means for raising comprises a look-up memory.

31. The apparatus of claim 25, 28, 30, or 27 wherein said means for approximating, combining, and obtaining dot products comprise a fixed-point multiplier and a fixed-point adder controlled by a pixel processor controller.

* * * * *